(12) United States Patent
Williams et al.

(10) Patent No.: US 6,966,864 B2
(45) Date of Patent: *Nov. 22, 2005

(54) TWO-SPEED TRANSFER CASE WITH BALL-RAMP CLUTCH AND SINGLE MOTOR ACTIVATOR/SHIFT SYSTEM

(75) Inventors: Randolph C. Williams, Weedsport, NY (US); Hemant S. Suthar, Rochester, NY (US); Aaron Ronk, Lake George, NY (US)

(73) Assignee: Magna Drivetrain of America, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/999,292

(22) Filed: Nov. 29, 2004

(65) Prior Publication Data

US 2005/0070392 A1  Mar. 31, 2005

Related U.S. Application Data

(63) Continuation of application No. 10/630,450, filed on Jul. 30, 2003, now Pat. No. 6,824,487, which is a continuation of application No. 10/080,752, filed on Feb. 22, 2002, now Pat. No. 6,645,109.

(60) Provisional application No. 60/278,954, filed on Mar. 27, 2001.

(51) Int. Cl.$^7$ ............................................. F16H 37/08
(52) U.S. Cl. ...................... 475/204; 475/201; 475/206; 180/248
(58) Field of Search ................................. 475/198, 199, 475/201, 204, 205, 206; 180/248, 249; 192/84.6, 192/93 A, 93 C

(56) References Cited

U.S. PATENT DOCUMENTS

| | | |
|---|---|---|
| 4,718,303 A | 1/1988 | Fogelberg |
| 4,895,236 A | 1/1990 | Sakakibara et al. |
| 4,950,214 A | 8/1990 | Botterill |
| 4,976,347 A | 12/1990 | Sakakibara et al. |
| 5,083,986 A | 1/1992 | Teraoka et al. |
| 5,199,325 A | 4/1993 | Reuter et al. |
| 5,215,160 A | 6/1993 | Williams et al. |
| 5,323,871 A | 6/1994 | Wilson et al. |

(Continued)

FOREIGN PATENT DOCUMENTS

EP   0924118   *  6/1999

(Continued)

*Primary Examiner*—Ha Ho
(74) *Attorney, Agent, or Firm*—Harness, Dickey & Pierce P.L.C.

(57) ABSTRACT

A transfer case is provided with a range unit, an interaxle differential, a clutch assembly and a power-operated actuation mechanism. The range unit includes a planetary gearset driven by an input shaft, and a synchronized dog clutch assembly for releasably coupling one of the input shaft or an output component of the planetary gearset to an input member of the interaxle differential. The interaxle differential further includes a first output member driving a first output shaft, a second output member operably driving a second output shaft. The clutch assembly is a multi-plate friction clutch operably disposed between the first and second output shafts. The power-operated actuation mechanism includes a range actuator assembly, a ball-ramp clutch actuator assembly and a motor assembly operable to control actuation of the range actuator assembly and the clutch actuator assembly.

13 Claims, 3 Drawing Sheets

U.S. PATENT DOCUMENTS

| | | |
|---|---|---|
| 5,330,030 A | 7/1994 | Eastman et al. |
| 5,332,060 A | 7/1994 | Sperduti et al. |
| 5,363,938 A | 11/1994 | Wilson et al. |
| 5,407,024 A | 4/1995 | Watson et al. |
| 5,462,496 A | 10/1995 | Dick et al. |
| 5,499,951 A * | 3/1996 | Showalter .................. 475/204 |
| 5,655,986 A | 8/1997 | Wilson et al. |
| 5,853,342 A * | 12/1998 | Pritchard et al. ........... 475/206 |
| 6,398,686 B1 | 6/2002 | Irwin |
| 6,484,857 B2 | 11/2002 | Vonnegut et al. |

FOREIGN PATENT DOCUMENTS

| | | | |
|---|---|---|---|
| EP | 1036691 | * | 9/2000 |
| JP | 358146723 | | 9/1983 |
| JP | 3-66927 | | 3/1991 |

* cited by examiner

TWO-SPEED TRANSFER CASE WITH BALL-RAMP CLUTCH AND SINGLE MOTOR ACTIVATOR/SHIFT SYSTEM

CROSS-REFERENCE TO RELATED APPLICATIONS

This application is a continuation of U.S. patent application Ser. No. 10/630,450 filed Jul. 30, 2003 now U.S. Pat. No. 6,824,487 which is a continuation of U.S. patent application Ser. No. 10/080,752 filed on Feb. 22, 2002 (now U.S. Pat. No. 6,645,109) which claims the benefit of U.S. Provisional Application No. 60/278,954 filed on Mar. 27, 2001.

FIELD OF THE INVENTION

The present invention is generally related to transfer cases for use in four-wheel drive vehicles and, more particularly, to an improved two-speed on-demand transfer case equipped with a ball-ramp clutch assembly.

BACKGROUND OF THE INVENTION

In view of increased consumer popularity in four-wheel drive vehicles, a plethora of power transfer systems are currently being utilized in vehicular driveline applications for selectively directing power (i.e., drive torque) from the powertrain to all four wheels of the vehicle. In many power transfer systems, a transfer case is incorporated into the driveline and is operable in a four-wheel drive mode for delivering drive torque from the powertrain to both the front and rear wheels. Many conventional transfer cases are equipped with a mode shift mechanism that can be selectively actuated to shift between a two-wheel drive mode and a four-wheel drive mode. In addition, many transfer cases also include a range shift mechanism which can be selectively actuated by the vehicle operator for shifting between four-wheel high-range and low-range drive modes.

It is also known to use "on-demand" power transfer systems for automatically biasing power between the front and rear wheels, without any input or action on the part of the vehicle operator, when traction is lost at either the front or rear wheels. Modernly, it is known to incorporate the "on-demand" feature into a transfer case by replacing the mechanically-actuated mode shift mechanism with a clutch assembly that is interactively associated with an electronic control system and a sensor arrangement. During normal road conditions, the clutch assembly is typically maintained in a non-actuated condition such that drive torque is only delivered to the rear wheels. However, when the sensors detect a low traction condition, the clutch assembly is automatically actuated to deliver torque "on-demand" to the front wheels. Moreover, the amount of drive torque transferred through the clutch assembly to the non-slipping wheels can be varied as a function of specific vehicle dynamics, as detected by the sensor arrangement. This on-demand clutch control system can also be used in full-time transfer cases to automatically bias the torque ratio across an interaxle differential.

In some two-speed on-demand transfer cases the range shift mechanism and the clutch assembly are independently controlled by separate power-operated actuators. For example, U.S. Pat. No. 5,407,024 discloses a two-speed range shift mechanism actuated by an electric motor and a clutch assembly actuated by an electromagnetic coil. In an effort to reduce cost and complexity, some transfer cases are equipped with a single power-operated actuator that is operable to coordinate actuation of both the range shift mechanism and the clutch assembly. In particular, U.S. Pat. Nos. 5,363,938 and 5,655,986 each illustrate a transfer case equipped with a motor-driven sector with cam surfaces adapted to coordinate actuation of the range shift mechanism and the clutch assembly for establishing a plurality of distinct two-wheel and four-wheel drive modes. While transfer cases equipped with such coordinated actuation systems have been commercially successful, a need exists to develop alternative systems which further reduce the lost and complexity of two-speed on-demand transfer cases.

SUMMARY OF THE INVENTION

Accordingly, it is an object of the present invention to provide a transfer case equipped with a two-speed range unit, a clutch assembly, and a power-operated actuation mechanism for controlling coordinated actuation of the range unit and the clutch assembly.

It is another object of this invention that the transfer case be interactively associated with a control system for controlling operation of the power-operated actuation mechanism to establish various four-wheel high-range and low-range drive modes.

It is further object of the present invention to locate the clutch assembly across an interaxle differential to provide automatic torque biasing in a full-time four-wheel drive mode.

As a related object, the clutch assembly can be operably disposed between the front and rear output shafts to provide automatic torque transfer in an on-demand four-wheel drive mode.

Another object is to provide a synchronized range unit for permitting on-the-move shifting between high-range and low-range drive modes.

According to a preferred embodiment, a transfer case is provided with a range unit, an interaxle differential, a clutch assembly, a power-operated actuation mechanism, and a control system. The range unit includes a planetary gearset driven by an input shaft, and a synchronized dog clutch assembly for releasably coupling one of the input shaft or an output component of the planetary gearset to an input member of the interaxle differential. The interaxle differential further includes a first output member driving a first output shaft, a second output member operably driving a second output shaft, and a gearset transferring drive torque from the input member to the first and second output members. The clutch assembly is a multi-plate friction clutch operably disposed between the first and second output shafts. The power-operated actuation mechanism includes an electric motor assembly, a drive shaft driven by the motor assembly, a range actuator assembly and a clutch actuator assembly. The range actuator assembly includes a cam rotatively driven by the drive shaft, and a shift fork having a follower segment retained in a groove formed in the cam and a fork segment retained in a groove formed in a shift collar associated with the synchronzied dog clutch assembly. Rotation of the cam results in movement of the shift collar between high-range (H), neutral (N) and low-range (L) positions. The clutch actuator assembly includes a ball-ramp unit and a gear assembly. The ball-ramp unit includes a first plate, a second plate, and balls retained in ramped grooves formed between the first and second plates. The gear assembly includes a first gear driven by the drive shaft, a second gear fixed to the first plate of the ball-ramp unit, and a third gear meshed with the first and second gears. The control system is adapted to control the magnitude and direction of rotary motion of the drive shaft through controlled energization of the motor assembly.

The power-operated actuation system of the present invention is arranged to permit sufficient bidirectional rotation of the drive shaft to move the shift collar between its H and L positions without causing the ball-ramp unit to engage the multi-plate clutch. However, once the shift collar is positively located in either of the H or L positions, continued rotation of the drive shaft causes actuation of the ball-ramp unit for exerting a clutch engagement force on the multi-plate friction clutch.

BRIEF DESCRIPTION OF THE DRAWINGS

Further objects, features and advantages of the present invention will become apparent from analysis of the following written specification including the appended claims, and the accompanying drawings in which:

DETAILED DESCRIPTION OF THE PREFERRED EMBODIMENTS

Figure 1:
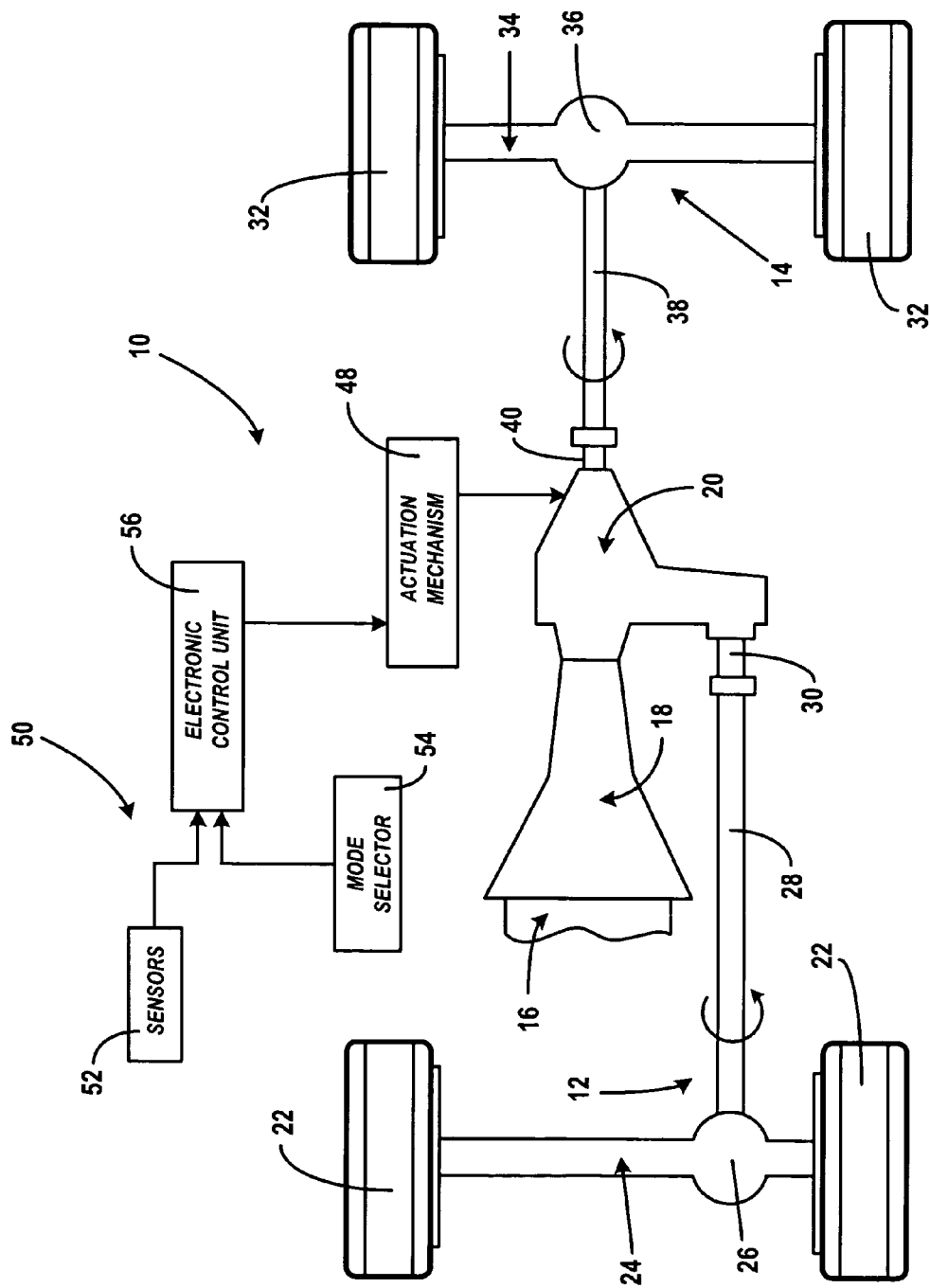
FIG. 1 is a schematic view of a four-wheel drive vehicle equipped with a transfer case and a control system according to the present invention.

Referring now to the drawings, a four-wheel drive vehicle 10 is schematically shown to include a front driveline 12 and a rear driveline 14 both drivable from a powertrain. The powertrain is shown to include an engine 16 and a transmission 18 which may be of either the manual or automatic type. In the particular embodiment shown, vehicle 10 further includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be further detailed, transfer case 20 is equipped with a two-speed range unit 42, an interaxle differential 44, a clutch assembly 46, and a power-operated actuation mechanism 48 operable to control coordinated shifting of range unit 42 and adaptive engagement of clutch assembly 46. In addition, a control system 50 is provided for controlling actuation of actuation mechanism 48. Control system 50 includes sensors 52 for detecting real time operational characteristics of motor vehicle 10, a mode selector 54 for permitting the vehicle operator to select one of the available drive modes, and an electronic control unit 56 operable to generate control signals in response to input signals from sensors 52 and mode signals from mode selector 54. The control signals are sent to an electric motor assembly 58 associated with actuation mechanism 48.

Figure 2:
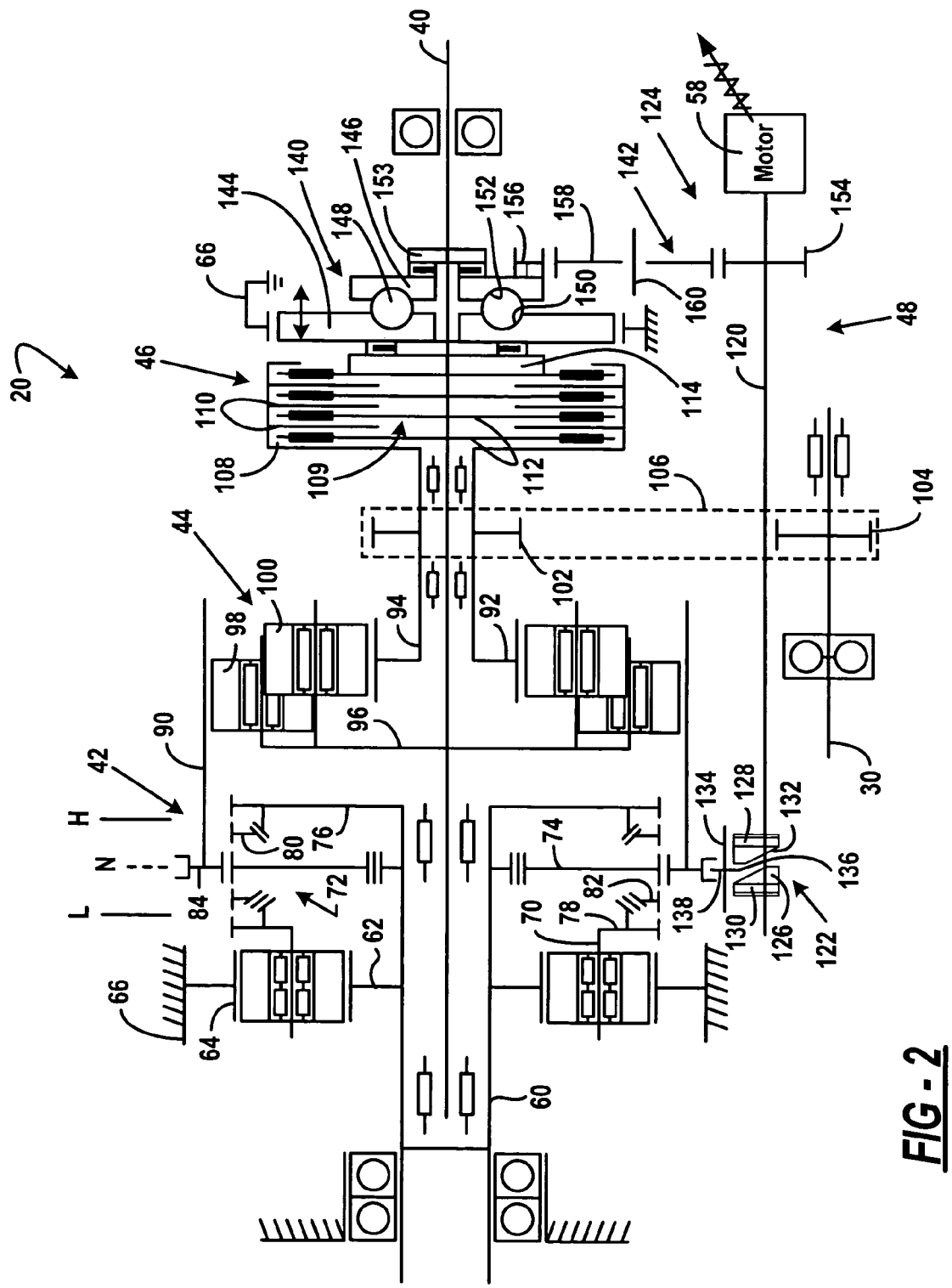
FIG. 2 is a schematic diagram of a full-time two-speed transfer case according to the present invention which shows the components associated with the range unit, the clutch assembly, and the power-operated actuation mechanism.

With particular reference to FIG. 2, transfer case 20 is schematically shown to include an input shaft 60 adapted to be driven by the output of transmission 18. Range unit 42 includes a planetary gearset having a sun gear 62 driven by input shaft 60, a ring gear 64 fixed to a stationary housing 66, and planet gears 68 rotatably supported by a planet carrier 70 and which are meshed with both sun gear 62 and ring gear 64. Range unit 42 further includes a synchronized dog clutch assembly 72 having a clutch hub 74 journalled on input shaft 60, a first clutch plate 76 fixed for rotation with input shaft 60, and a second clutch plate 78 fixed for rotation with planet carrier 70. Synchronized dog clutch assembly 72 further includes a first synchronizer 80 disposed between clutch hub 74 and first clutch plate 76, a second synchronizer 82 disposed between clutch hub 74 and second clutch plate 78, and a shift collar 84 splined for rotation with and bidirectional axial sliding movement on clutch hub 74. Shift collar 84 is shown in its neutral (N) position where it is disengaged from both first clutch plate 76 and second clutch plate 78. Shift collar 84 is moveable from its N position to a high-range (H) position whereat shift collar 84 is coupled to first clutch plate 76 and is driven at a direct speed ratio relative to input shaft 60. In contrast, shift collar 84 can be moved from its N position to a low-range (L) position whereat shift collar 84 is coupled to second clutch plate 78 and is driven by planet carrier 70 at a reduced speed ratio relative to input shaft 60. First synchronizer 80 functions to establish speed synchronization between shift collar 84 and input shaft 60 during movement of shift collar 84 toward its H position. Likewise, second synchronizer 82 functions to establish speed synchronization between shift collar 84 and planet carrier 70 during movement of shift collar 84 toward its L position.

Interaxle differential 44 includes an input member driven by shift collar 84, a first output member driving rear output shaft 40, and a second output member operably arranged to drive front output shaft 30. In particular, differential 44 includes an annulus gear 90 fixed for rotation with shift collar 84, a sun gear 92 fixed to a quill shaft 94 rotatably supported on rear output shaft 40, and a pinion carrier 96 fixed to rear output shaft 40 which rotatably supports meshed pairs of first pinion gears 98 and second pinion gears 100. In addition, first pinion gears 98 are meshed with annulus gear 90 and second pinion gears 100 are meshed with sun gear 92. As such, driven rotation of annulus gear 90 (at either of the direct or reduced speed ratios) causes drive torque to be transmitted to rear output shaft 40 via pinion carrier 96 and to quill shaft 94 via sun gear 92. Drive torque is transferred from quill shaft 94 to front output shaft 30 via a chain drive assembly which includes a drive sprocket 102 fixed to quill shaft 94, a driven sprocket 104 fixed to front output shaft 30, and a drive chain 106 meshed with sprockets 102 and 104. Based on the particular configuration of interaxle differential 44, a specific torque distribution ratio is established (i.e., 50/50, 64/36) between rear output shaft 40 and front output shaft 30.

With continued reference to FIG. 2, clutch assembly 46 is shown to be a multi-plate friction clutch comprised of a clutch drum 108 fixed to quill shaft 94, a clutch pack 109 having outer clutch rings 110 splined for rotation with clutch drum 108 which are interleaved with inner clutch rings 112 splined to rear output shaft 40, and an apply plate 114 for applying an axially-directed clutch engagement force on clutch pack 109.

Power-operated actuation mechanism 48 is operable to cause movement of shift collar 84 between its three distinct positions as well as to generate the clutch engagement force exerted on clutch pack 109 of clutch assembly 46. In its most basic sense, actuation mechanism 48 includes motor assembly 58, a drive shaft 120 rotatively driven by the output of motor assembly 58, a range actuator assembly 122 and a clutch actuator assembly 124. Motor assembly 58 is preferably an electric gearmotor equipped with an encoder capable of accurately sensing the rotated position of driveshaft 120. Range actuator assembly 122 includes a range cam 126 fixed for rotation with drive shaft 120. Cam 126 is cylindrical and includes a high-range circumferential groove 128, a low-range circumferential groove 130, and a spiral intermediate groove 132 connecting circumferential grooves 128 and 130. Range actuator assembly 122 further includes a range fork 134 having a follower segment 136 shown retained in spiral groove 132, and a fork segment 138 retained in an annular groove formed on shift collar 84.

As will be appreciated, rotation of range cam 126 results in axial movement of shift collar 84 due to retention of follower segment 136 in spiral groove 132. Specifically, rotation of drive shaft 120 in a first direction causes concurrent rotation of range cam 126 which, in turn, causes follower segment 136 to move within spiral groove 132 until shift collar 84 is located in its H position. At this position, follower segment 136 enters high-range dwell groove 128 which permits continued rotation of drive shaft 120 in the first direction while shift collar 84 is retained in its H position with the high-range drive connection established between input shaft 60 and annulus gear 90. Thereafter, rotation of drive shaft 120 and range cam 126 in the opposite second direction causes follower segment 136 to exit high-range dwell groove 128 and re-enter intermediate spiral groove 132 for causing shift collar 84 to begin moving from the H position toward its L position. Upon continued rotation of range cam 126 in the second direction, follower segment 136 exits spiral groove 132 and enters low-range dwell groove 130 for locating shift collar 84 in its L position and establishing the low-range drive connection between planet carrier 70 and annulus gear 90.

Clutch actuator assembly 124 is also driven by motor assembly 58 and includes a ball-ramp unit 140 and a gear assembly 142. Ball-ramp unit 140 includes a first ball-ramp plate 144, a second ball-ramp plate 146, and a plurality of balls 148 disposed in ramped grooves 150 and 152 formed in corresponding face surfaces of plates 144 and 146. First ball-ramp plate 144 is non-rotatably secured to housing 66 and is supported for bidirectional axial movement. Specifically, first ball-ramp plate 144 is shown to coaxially surround rear output shaft 40 and is arranged to move axially for exerting an axially-directed clutch engagement force on apply plate 114 for frictionally engaging clutch pack 109. A thrust bearing is shown located between apply plate 114 and first ball-ramp plate 144 for permitting relative rotation therebetween. Second ball-ramp plate 146 also coaxially surrounds rear output shaft 40 and is supported for limited rotation relative to first ball-ramp plate 144. Second ball-ramp plate 146 is axially restrained relative to rear output shaft 40 via a backing plate 153 and a thrust bearing is shown located therebetween. As such, relative rotation between ball-ramp plates 144 and 146 causes balls 148 to travel along ramped grooves 150 and 152 which, in turn, acts to control the axial position of second ball-ramp plate 146 relative to clutch pack 109, thereby controlling the magnitude of the clutch engagement force exerted thereon.

Gear assembly 142 includes a first gear 154 fixed for rotation with drive shaft 120, a second gear 156 fixed to second ball-ramp plate 146, and a third gear 158 rotatably supported on an idlershaft 160 and which is meshed with both first gear 154 and second gear 156. Preferably, second gear 156 is an arcuate gear segment formed integrally with, or rigidly secured to, an outer face surface of second ball-ramp plate 146. The profile of ramped grooves 150 and 152 and the gear ratio established by gear assembly 142 between drive shaft 120 and second ball-ramp plate 146 are designed to permit bidirectional rotation of drive shaft 120 through a range of travel sufficient to permit shift collar 84 to move between its H and L positions without any significant clutch engagement force being transmitted by ball-ramp unit 140 to clutch assembly 46. However, additional bi-directional rotation of drive shaft 120, as accommodate by dwell grooves 128 and 130 in range cam 126, is designed to cause axial movement of second ball-ramp plate 146 between an "adapt-ready" position and a "locked" position. In the adapt-ready position, a minimum clutch engagement force is exerted on clutch pack 109 such that clutch assembly 46 is considered to be non-actuated. Preferably, this clutch engagement force applies a preload on clutch pack 109 to eliminate driveline clunk and permit instantaneous clutch actuation. Conversely, in the locked position, a maximum clutch engagement force is exerted on clutch pack 109 and clutch assembly 46 is considered to be fully engaged. Thus, by varying the position of second ball-ramp plate 146 between its adapt-ready and locked position, the torque bias across differential 44 can be continuously modulated to provide automatic clutch control of clutch assembly 46 in a range between its released and fully engaged conditions.

Control system 50 is provided to control the rotated position of drive shaft 120 in response to the mode signal delivered to ECU 56 by mode selector 54 and the sensor input signals sent by sensors 52. While sensors 52 can provide numerous indicators (i.e., shaft speeds, vehicle speed, acceleration/throttle position, brake status, etc.), it is contemplated that clutch assembly 46 is controlled, at a minimum, in response the magnitude of interaxle slip ($\Delta$RPM) between output shafts 40 and 30. Mode selector 54 permits selection of one an Automatic Full-Time four-wheel high-range (Auto-4WH) drive mode, a Neutral mode, and a Locked four-wheel low-range (Lock-4WL) drive mode. In the Auto-4WH mode, shift collar 84 is located in its H position and the torque biasing generated by clutch assembly 46 is continuously modulated based on value of the sensor signals. In the Lock-4WL mode, shift collar 84 is in its L position and clutch assembly 46 is fully engaged. In the Neutral mode, shift collar 84 is in its N position and clutch assembly 46 is released. Obviously, other available drive modes can be provided if desired. For example, a Locked four-wheel high-range (LOCK-4WH) drive mode can be established by locating shift collar 84 in its H position and fully engaging clutch assembly 46.

Figure 3:
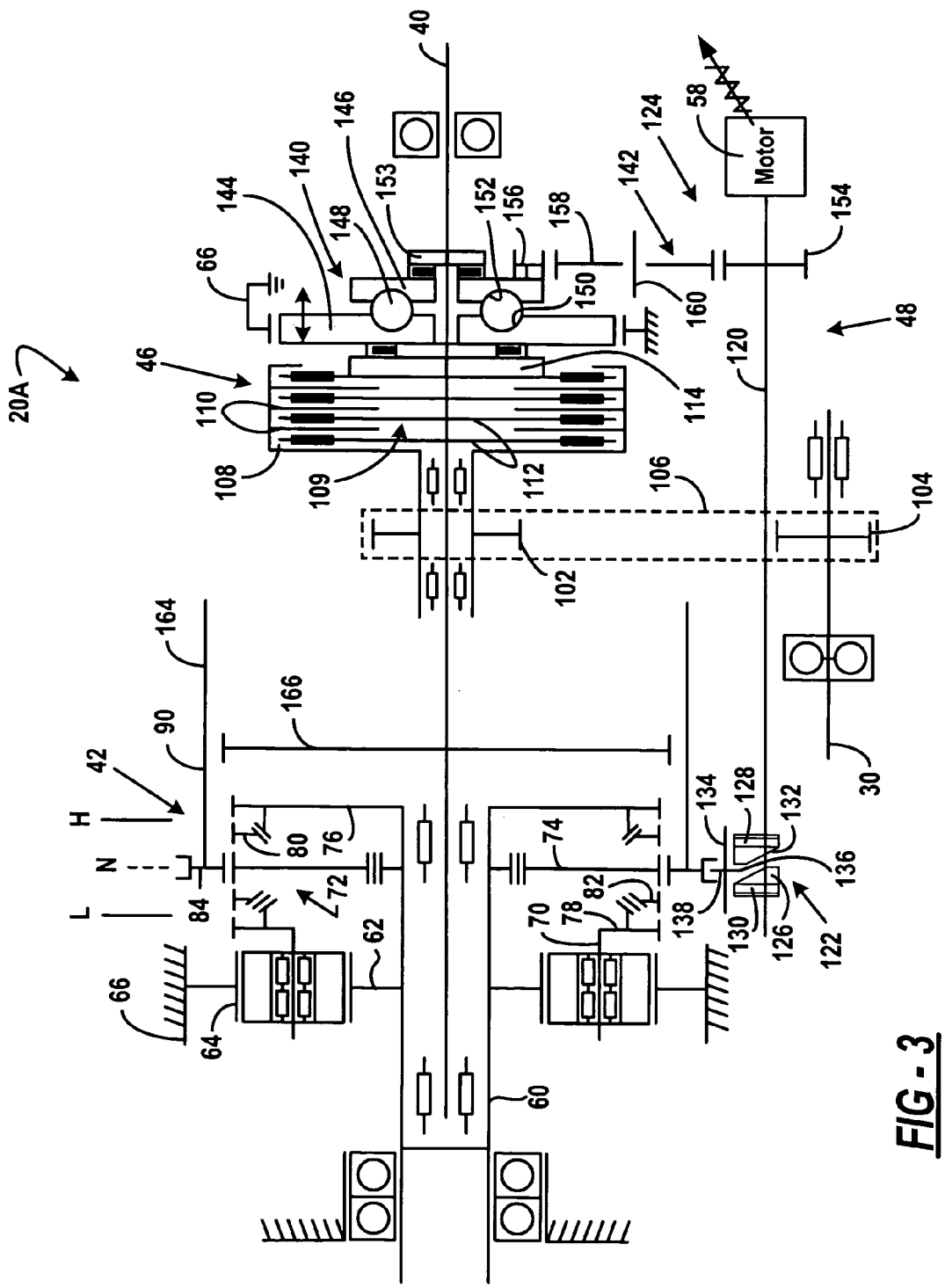
FIG. 3 is a schematic of an on-demand two-speed transfer case according to an alternative preferred embodiment of the present invention.

While actuation mechanism 48 has been disclosed in association with a full-time transfer case, it will be understood that differential 44 could be eliminated such that clutch assembly 46 functions to modulate the drive torque transferred from rear output shaft 40 to front output shaft 30 to establish an on-demand four-wheel drive mode. A modified version of transfer case 20 shown in FIG. 2 is shown in FIG. 3 as transfer case 20A which is operable to define on-demand four-wheel drive modes. Basically, shift collar 84 includes a drive ring 164 that is splined to a drive ring 166 that is fixed to rear output shaft 40 and clutch assembly 46 is arranged to transfer drive torque from rear output shaft 40 to front output shaft 30. Again, motor assembly 58 is operable to coordinate movement of shift collar 84 and ball-ramp unit 140 to establish various locked and on-demand four-wheel drive modes.

When on-demand transfer case 20A of FIG. 3 is used in association with vehicle 10 of FIG. 1, When on-demand transfer case 20A of FIG. 3 is used in association with vehicle 10 of FIG. 1, mode selector 54 would permit selection of a variety of available modes including, for example, a two-wheel high-range (2WH) drive mode, an on-demand four-wheel high-range (AUTO-4WH) drive mode, a part-time four-wheel high-range (LOCK-4WH) drive mode, a neutral (Neu) mode, and a part-time four-wheel low-range (LOCK-4WH) drive mode. Specifically, in the 2WH drive mode, shift collar 84 would be located in its H position and clutch assembly 46 would be released such that all drive torque is delivered to rear output shaft 40. In the AUTO-4WH mode, shift collar 84 would be located in its H position and clutch assembly 46 would be continuously modulated based on the value of the sensor signals to vary the torque distribution ratio between rear output shaft 40 and front output shaft 30 in a range between 100:0 and 50:50. In the LOCK-4WH position, shift collar 84 would still be located in its H position and clutch assembly 46 would be fully engaged to effectively couple front output shaft 30 to rear output shaft 40. Similarly, when the LOCK-4WL mode is selected, controller 56 controls actuation mechanism 48 to locate shift collar 84 in its L position while fully engaging clutch assembly 46.

The above reference embodiments clearly set forth the novel and unobvious features, structure and/or function of the present invention. However, one skilled in the art will appreciate that equivalent elements and/or arrangements made be used which will be covered by the scope of the following claims.

What is claimed is:

1. A transfer case comprising:

an input shaft;

first and second output shafts;

an interaxle differential having an input member, a first output member coupled to said first output shaft, a second output member coupled to said second output shaft, and a gearset interconnecting said input member to said first and second output members;

a range unit having an output component driven at a reduced speed relative to said input shaft;

a range clutch operable in a high-range mode to couple said input member of said interaxle differential for rotation with said input shaft and in a low-range mode to couple said input member of said interaxle differential for rotation with said output component of said range unit;

a mode clutch operable in a released mode to permit unrestricted speed differentiation between said first and second output members of said interaxle differential and in a locked mode to prevent speed differentiation therebetween; and a power-operated actuation mechanism including a motor, a drive shaft driven by said motor, a first cam mechanism driven by said drive shaft for shifting said range clutch between its high-range and low-range mode in response to rotation of said drive shaft through a first amount of rotary travel, a second cam mechanism for shifting said mode clutch between its released and locked modes in response to rotation of said drive shaft through a second amount of rotary travel, and a rotary drive mechanism connecting said second cam mechanism to said drive shaft, said second cam mechanism including a first cam member, a second cam member having a gear segment and rollers engaging a cam surface formed on at least one of said first and second cam members, and said rotary drive mechanism including a gearset driven by said drive shaft and meshed with said gear segment of said second cam member.

2. The transfer case of claim 1 wherein said cam surface causes one of said first and second cam members to move axially between a first position whereat said mode clutch is in its released mode and a second position whereat said mode clutch is in its locked mode in response to rotary movement of said second cam member.

3. The transfer case of claim 1 wherein said range clutch includes a dog clutch moveable between a first position and a second position, said dog clutch operable in its first position to establish said high-range mode and in its second position to establish its low-range mode, and wherein said first cam mechanism causes movement of said dog clutch in response to rotation of said drive shaft through said first amount of travel for moving said dog clutch between its first and second positions.

4. The transfer case of claim 3 wherein said first cam mechanism includes a cam driven by said drive shaft and a range fork having a first segment retained in a groove formed in said cam and a second segment engaging said dog clutch.

5. A transfer case comprising:

an input shaft;

first and second output shafts;

a range unit driven by said input shaft and having an output component driven at a reduced speed relative to said input shaft;

a range clutch operable in a high-range mode to couple said first output shaft for rotation with said input shaft and in a low-range mode to couple said first output shaft for rotation with said output component of said range unit;

a mode clutch operable in a released mode to permit relative rotation between said first and second output shafts and in a locked mode to prevent relative rotation therebetween; and a power-operated actuation mechanism including a motor, a drive shaft driven by said motor, a range cam mechanism for shifting said range clutch between its high-range and low-range mode in response to rotation of said drive shaft through a first amount of rotary travel, a mode cam mechanism for shifting said mode clutch between its released and locked modes in response to rotation of said drive shaft through a second amount of rotary travel, and a gearset connecting said mode cam mechanism to said drive shaft, said mode cam mechanism including a first cam member, a second cam member having a gear segment and rollers engaging a cam surface formed on at least one of said first and second cam members, said gearset interconnecting said gear segment of said second cam member for rotation with said drive shaft.

6. The transfer case of claim 5 wherein said cam surface causes one of said first and second cam members to move axially between a first position whereat said mode clutch is in its released mode and a second position whereat said mode clutch is in its locked mode in response to rotary movement of said second cam member.

7. The transfer case of claim 5 wherein said range clutch includes a dog clutch moveable between a first position and a second position, said dog clutch operable in its first position to establish said high-range mode and in its second position to establish its low-range mode, and wherein said range cam mechanism causes movement of said dog clutch in response to rotation of said drive shaft through its first amount of rotary travel for moving said dog clutch between its first and second positions.

8. The transfer case of claim 7 wherein said range cam mechanism includes a cam driven by said drive shaft and a range fork having a first segment retained in a groove formed in said cam and a second segment engaging said dog clutch.

9. A transfer case comprising:

an input shaft;

first and second output shafts;

an interaxle differential having an input member, a first output member coupled for rotation with said first output shaft, a second output member coupled for rotation with said second output shaft, and a gearset interconnecting said input member to said first and second output members;

a range unit driven by said input shaft and having an output component driven at a reduced speed relative to said input shaft;

a range clutch operable in a high-range mode to couple said input member of said differential for rotation with said input shaft and in a low-range mode to couple said input member of said differential for rotation with said output component of said range unit;

a mode clutch operable in a released mode to permit relative rotation between said first and second output shafts and in a locked mode to prevent relative rotation therebetween;

a range actuator moveable between a first position and a second position for causing corresponding shifting of said range clutch between its high-range and low-range modes;

a mode actuator having a first cam, a second cam, and rollers disposed between said first and second cams, wherein one of said first and second cams is adapted to move between a first position whereat said mode clutch is in its released mode and a second position whereat said mode clutch is in its locked mode in response to rotation of said second cam; and a power-operated actuation mechanism including a drive shaft, a first rotary device interconnecting said range actuator for rotation with said drive shaft, a second rotary device interconnecting said second cam for rotation with said drive shaft, and a motor for driving said drive shaft.

10. The transfer case of claim 9 wherein said second rotary device is a gear assembly interconnecting said second cam for rotation with said drive shaft.

11. A transfer case comprising:

an input shaft;

first and second output shafts;

a range unit driven by said input shaft and having an output component driven at a reduced speed relative to said input shaft;

a range clutch operable in a high-range mode to couple said first output shaft for rotation with said input shaft and in a low-range mode to couple said first output shaft for rotation with said output component of said range unit;

a mode clutch operable in a released mode to permit relative rotation between said first and second output shafts and in a locked mode to prevent relative rotation therebetween;

a range actuator moveable between a first position and a second position for causing corresponding shifting of said range clutch between its high-range and low-range modes;

a mode actuator having a first plate, a second plate, and rollers engaging cam surface formed between said first and second plates, wherein one of said first and second plate is adapted to move between a first position whereat said mode clutch is in its released mode and a second position whereat said mode clutch is in its locked mode in response to rotation of said second plate; and a power-operated actuation mechanism including a drive shaft, a first rotary device interconnecting said range actuator for rotation with said drive shaft, a second rotary device interconnecting said second plate for rotation with said drive shaft, and a motor for driving said drive shaft.

12. The transfer case of claim 11 wherein said second rotary device is a gear assembly interconnecting said second plate for rotation with said drive shaft.

13. The transfer case of claim 12 wherein said gear assembly includes a first gear fixed for rotation with said drive shaft, a second gear fixed to said second plate, and a third gear meshed with said first and second gears.

* * * * *